(12) United States Patent
Palmer

(10) Patent No.: US 9,611,939 B2
(45) Date of Patent: Apr. 4, 2017

(54) GATE VALVE WITH EQUALIZER PORT

(71) Applicant: Thunder Rose Enterprises, Inc., Big Sandy, TX (US)

(72) Inventor: Michael J. Palmer, Big Sandy, TX (US)

(73) Assignee: Thunder Rose Enterprises, Inc., Big Sandy, TX (US)

(*) Notice: Subject to any disclaimer, the term of this patent is extended or adjusted under 35 U.S.C. 154(b) by 754 days.

(21) Appl. No.: 13/668,134

(22) Filed: Nov. 2, 2012

(65) Prior Publication Data

US 2013/0056670 A1    Mar. 7, 2013

Related U.S. Application Data

(63) Continuation-in-part of application No. 12/102,168, filed on Apr. 14, 2008, now Pat. No. 8,302,630.

(51) Int. Cl.
*F16K 31/18* (2006.01)
*F16K 3/02* (2006.01)
(Continued)

(52) U.S. Cl.
CPC ............ *F16K 3/0209* (2013.01); *F16K 3/029* (2013.01); *F16K 3/314* (2013.01); *F16K 39/04* (2013.01);
(Continued)

(58) Field of Classification Search
CPC .... F16K 39/04; F16K 11/0655; F16K 27/044; F16K 3/314; F16K 3/029; F16K 3/0209; F16K 3/18; F02D 9/06; F02D 9/14; G05D 11/035; Y10T 137/2564; Y10T 137/88038; Y10T 137/8803; Y10T 137/88022; Y10T 137/86831; Y10T 137/8696; Y10T 137/86944;
(Continued)

(56) References Cited

U.S. PATENT DOCUMENTS 588,430 A    8/1897  Hirt
723,803 A    3/1903  Abeling
(Continued)

FOREIGN PATENT DOCUMENTS

DE    2546024    4/1977
JP    47026011   11/1972
(Continued)

OTHER PUBLICATIONS

Australian Patent Examination Report No. 1 received in Australian Patent Application No. 2009236469, dated Jun. 28, 2011, 2 pages.
(Continued)

*Primary Examiner* — Craig J Price
(74) *Attorney, Agent, or Firm* — Marc A. Hubbard; Hubbard Johnston, PLLC

(57) ABSTRACT

A gate valve is comprised of a gate movable between open and closed positions within a valve body, and gate having defined through it the gate an equalizer port or passageway between opposite sides of the gate with fixed side walls. The equalizer passageway being is opened and closed by an internal gate. The internal gate is in a close fitting engagement with each of a pair of opposing valve seats mounted with the gate and is shiftable by a carrier that does not constrain movement of the internal gate as it sits between the valve seats.

13 Claims, 15 Drawing Sheets

(51) Int. Cl.
*F16K 39/04* (2006.01)
*F16K 3/314* (2006.01)

(52) U.S. Cl.
CPC .. *Y10T 137/8696* (2015.04); *Y10T 137/86509* (2015.04); *Y10T 137/86831* (2015.04); *Y10T 137/86944* (2015.04); *Y10T 137/87378* (2015.04); *Y10T 137/87491* (2015.04)

(58) Field of Classification Search
CPC ..... Y10T 137/86509; Y10T 137/87515; Y10T 137/87491; Y10T 137/87378
USPC .... 137/599.16, 601.12, 601.15, 625.12, 629, 137/630.12, 625.42, 614.16–614.18, 111
See application file for complete search history.

(56) References Cited

U.S. PATENT DOCUMENTS

| | | | |
|---|---|---|---|
| 745,649 | A | 12/1903 | McWane |
| 745,774 | A | 12/1903 | Brady |
| 854,523 | A | 5/1907 | Noel |
| 994,587 | A | 6/1911 | Hartzell |
| 1,020,159 | A | 3/1912 | Price |
| 1,549,609 | A | 8/1925 | Redding |
| 1,932,471 | A | 10/1933 | McKellar |
| 3,463,193 | A | 8/1969 | Yost |
| 3,621,878 | A | 11/1971 | Smith |
| 3,658,087 | A | 4/1972 | Nelson |
| 4,150,684 | A | 4/1979 | Kervin |
| 4,177,833 | A | 12/1979 | Morrison |
| 4,480,659 | A | 11/1984 | Peacock |
| 4,678,008 | A | 7/1987 | Gyongyossy |
| 4,779,649 | A | 10/1988 | Balter |
| 5,101,861 | A | 4/1992 | Deville et al. |
| 5,370,155 | A | 12/1994 | Gyongyossy |

FOREIGN PATENT DOCUMENTS

| | | |
|---|---|---|
| JP | H0468262 | 6/1992 |
| JP | H0729366 | 6/1995 |
| JP | 200132951 | 2/2001 |
| LU | 33410 | 2/1995 |
| RU | 2238466 | 10/2004 |

OTHER PUBLICATIONS

Australian Patent Examination Report No. 2 received in Australian Patent Application No. 2009236469, dated Mar. 25, 2013, 3 pages.
Australian Patent Examination Report No. 1 received in Australian Divisional Patent Application No. 2013202121, dated Apr. 26, 2013, 3 pages.
Canadian Office Action received in Canadian Patent Application No. 2720267, dated Feb. 1, 2012, 2 pages.
Canadian Office Action received in Canadian Patent Application No. 2720267, dated Nov. 20, 2012, 2 pages.
Chinese Office Action and translation received in Chinese Patent Application No. 200980000050.7, dated May 3, 2012, 30 pages.
Chinese Office Action and translation received in Chinese Patent Application No. 200980000050.7, dated Apr. 3, 2013, 11 pages.
European Supplemental Search Report received in European Application No. 09703089.4, dated Apr. 26, 2012, 6 pages.
International Search Report and Written Opinion received in Patent Cooperation Treaty Application No. PCT/US09/39998, dated May 29, 2009, 11 pages.
Japanese Notice of Rejection and translation received in Japanese Patent Application No. 2011-505097, dated Aug. 13, 2012, 6 pages.
Korean Notice of Preliminary Rejection and translation received in Korean Patent Application No. 10-2010-7025473, dated Jul. 12, 2012, 7 pages.
Korean Notice of Last Preliminary Rejection and translation received in Korean Patent Application No. 10-2010-7025473, dated May 14, 2013, 3 pages.
New Zealand Examination Report received in New Zealand Patent Application No. 588356, dated May 17, 2012, 2 pages.
Philippine Office Action received in Philippines Patent Application No. 1/2010/502294, dated Dec. 5, 2012, 1 page.
Philippine Office Action received in Philippines Patent Application No. 1/2010/502294, dated Jul. 3, 2013, 2 pages.
Russian Office Action and translation received in Russian Patent Application No. 2009125228, dated Apr. 9, 2013, 5 pages.

GATE VALVE WITH EQUALIZER PORT

CROSS REFERENCE TO RELATED APPLICATIONS

This application is a continuation in part of U.S. patent application Ser. No. 12/102,168 filed Apr. 14, 2008, the entirety of which is hereby incorporated by reference.

FIELD

The present invention relates in general to fluid control valves. More specifically, but without restriction to the particular use which is shown and described, what is described relates to an equalizing device within a fluid control valve.

BACKGROUND

A gate valve is a type of fluid-control valve that opens by lifting a round or rectangular gate or wedge out of the path of the fluid. A feature common to all types of gate valves is that the sealing surfaces between the gate and seats are planar. The gate faces can form a wedge shape or they can be parallel. Gate valves are sometimes used for regulating flow, but many are not suited for that purpose, having been designed to be fully opened or closed. When fully open, the typical gate valve has no obstruction in the flow path, resulting in very low friction loss.

Gate valves are characterized as having a rising or a nonrising stem. Rising stems provide a visual indication of gate position. Nonrising stems are often used where vertical space is limited.

The bonnet provides leak-proof closure for the valve body. A bolted bonnet is generally used for larger valves and higher pressure applications.

Gate valves normally have compatible flange dimensional standards. Cast iron, cast carbon steel, gun metal, stainless steel, alloy steels, forged steel and forged materials are materials from which gate valves may be constructed.

A well-known drawback to gate valves is that in large-size, high pressure applications (defined herein as applications where the valve is greater than four inches in size and differential pressure on opposite sides of the gate is in excess of 5,000 psi), there is so much force on the gate that it is hard or impossible to open due to friction between the gate and its seal. Even where the gate is openable under such pressure, the friction between the gate and its seal, the force required on the actuator and the blasting action of the initial equalization flow across the cracked gate, singly or combined may be highly destructive to the valve.

The conventional solution to the problem is an external equalizing conduit between the two sides of the valve, with a small needle valve or the like manually-openable to equalize the pressures on the gate prior to it being opened. This solution, however, is highly dangerous to the operator due to a tendency of the needle valves to violently fail when operated under pressure. Thus there exists a need for a safe and effective means to control one or more fluids and to equalize the pressures on opposite sides of a gate valve in high pressure applications.

SUMMARY

The gate valve of the present invention has a gate with an internal equalizing port.

In one or more forms is a gate movable between opening and closing positions within a valve body, wherein the gate comprises one or more layers having a cavity therein and a shiftable component within said cavity arranged to be shiftable by actuation of the gate between the opening and closing positions and between closing and opening positions. An equalizer port may be adapted in the shiftable component, the equalizer port having a small surface area relative to the gate. An equalizer port may be adapted in the shiftable component, the equalizer port having a small surface area relative to the shiftable component. The shiftable component may be comprised of more than one part, the more than one part operable and movable between the opening and closing positions for linear actuation. The valve may be operable by an operator extending outside the gate valve. The shiftable component may have side surfaces that closely fit with adjacent internal side faces of the cavity and capable of sliding linear within the cavity. The shiftable component may have two opposing end surfaces such that one opposing end surface contacts an internal end face of the cavity in the opening position and the other opposing end surface contacts an opposing internal end face of the cavity in the closing position. At least one port in each of the one or more layers will align with each other in each layer in one of the embodiments. At least one port in each of the one or more layers may align with the equalizer port in the shiftable component when the gate is either in the opening position or the closing position.

In additional forms is a gate valve comprising a gate movable between open and closed positions by linear actuation, the gate housed within a valve body, the gate more than one layer, each layer having walls, the walls in each layer defining an external face and an opposing internal face, wherein the walls further define at least one first equalizer port located between the external face and opposing internal face of each layer, the at least one first equalizer port having a small surface area relative to the gate, and at least a cavity between the more than one layer, and at least a carrier housed within the cavity, the carrier further comprising at least one second equalizer port that aligns with the at least one first equalizer port at some point during linear actuation of the gate. The at least one first equalizer port and the at least one second equalizer port may not be aligned when the gate is in the closed position. The carrier may be operable for linear actuation by an operator extending outside the valve body. The carrier may have threads connected to a threaded rod extending to a handle. The carrier may be operable with a non-threaded rod extending to a handle. The carrier may have side surfaces spaced to closely fit with adjacent internal side faces of the cavity and capable sliding linear within the cavity. The carrier may have two opposite end surfaces, the end surfaces having a linear distance between them less than a linear distance between internal end faces of the cavity, such that the carrier has a range of linear travel within the cavity during linear actuation between the open and closed positions of the gate. The carrier may have one end surface contacting a first internal end face of the cavity when the gate is in the open position, and an opposing end surface contacting a second and opposing internal end face of the cavity when the gate is in the closed position.

Still further forms described herein include a gate valve comprising a gate having internal walls defining a main gate passageway and movable between opened and closed positions within a valve body, where in the opened position the main gate passageway is aligned with walls defining a main passageway in the valve body on opposite sides of the gate, to enable flow through the valve, and where in the closed position external faces of the gate are not aligned with the main passageway in the valve body, to prevent flow through the valve, and at least the gate being formed of layers with walls in the gate layers defining at least one port that extends through the walls; and at least a port adapted and arranged to be shiftable by actuation of the gate between the opened and closed positions and between closed and opened positions, and at least internal faces of the layers forming a cavity with an internal equalizer port being within the cavity, and at least an equalizer gate located within the cavity of the gate, the equalizer gate being movable between opening and closing positions and operable with an operator for linear actuation within the cavity, and at least the equalizer gate having side surfaces spaced closely with adjacent internal side faces of the cavity and enabling a sliding linear movement within the cavity; with at least the equalizer gate having at least one equalizer port being dimensioned and arranged to be aligned with the at least one gate port when the gate is in the opened position and to be out of alignment with at least one gate port when the gate is in the closed position. The layers may be joined by fastener pins. The equalizer gate may be formed of a central section and two flank sections on opposite sides of the central section, with female threads being formed in the central section for connection with a rod that extends outside the valve body. The flank sections may each having walls defining its own internal equalizer port. The at least one seal may be located between the equalizer gate and each respective internal face of the gate layers

BRIEF DESCRIPTION OF THE DRAWINGS

A more complete understanding of the invention and its advantages will be apparent from the Description taken in conjunction with the accompanying drawings, in which.

DESCRIPTION

Figure 1:
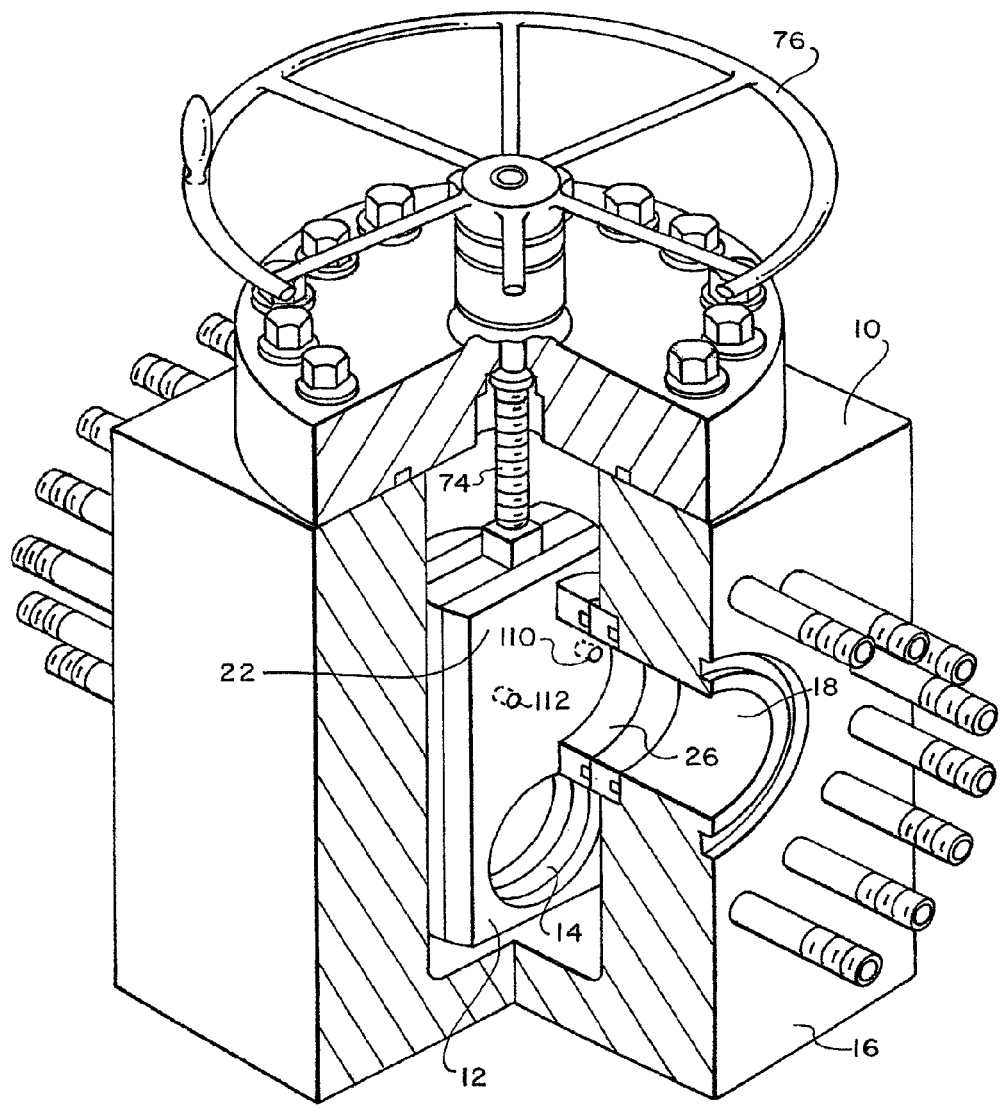
FIG. 1 is a partially broken-away perspective view of a valve described herein.
Figure 2:
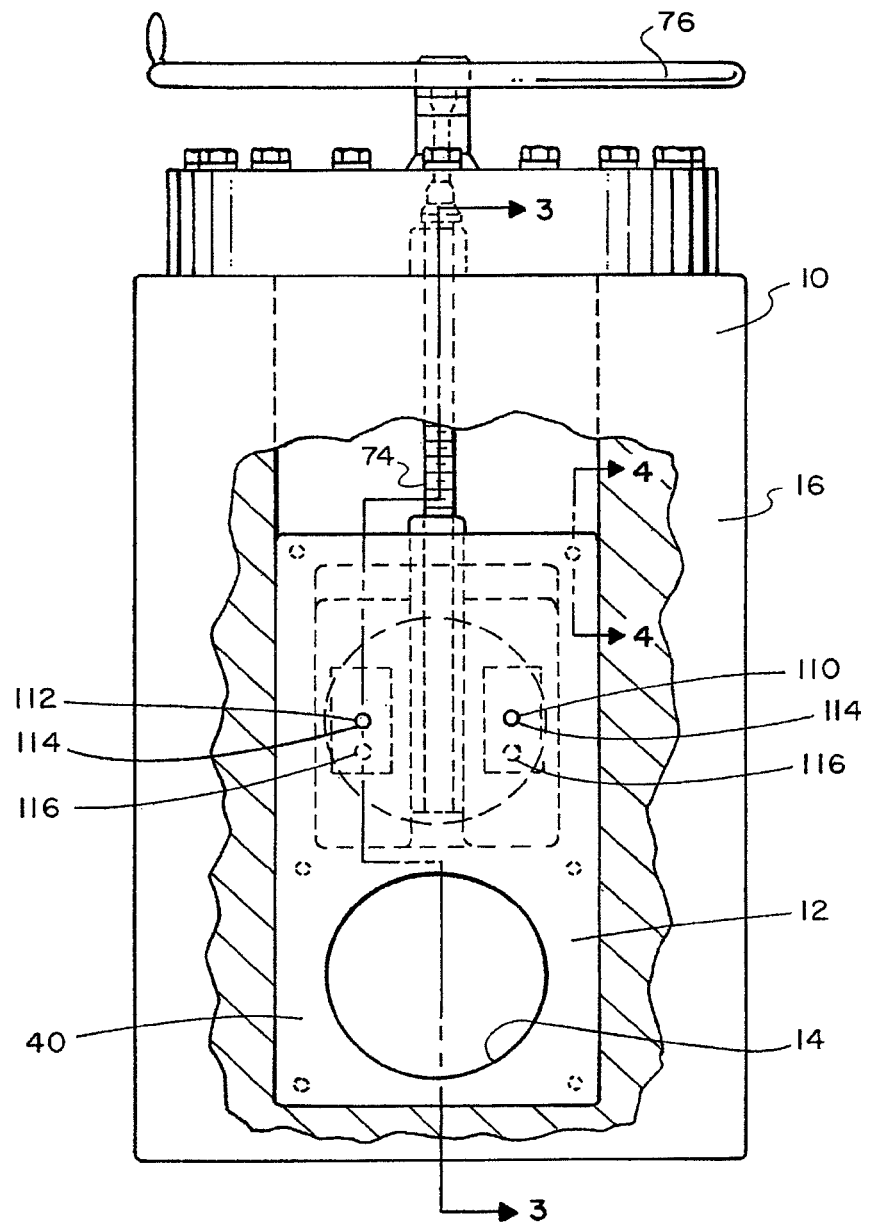
FIG. 2 is a partially broken-away side view of the valve of FIG. 1.
Figure 3:
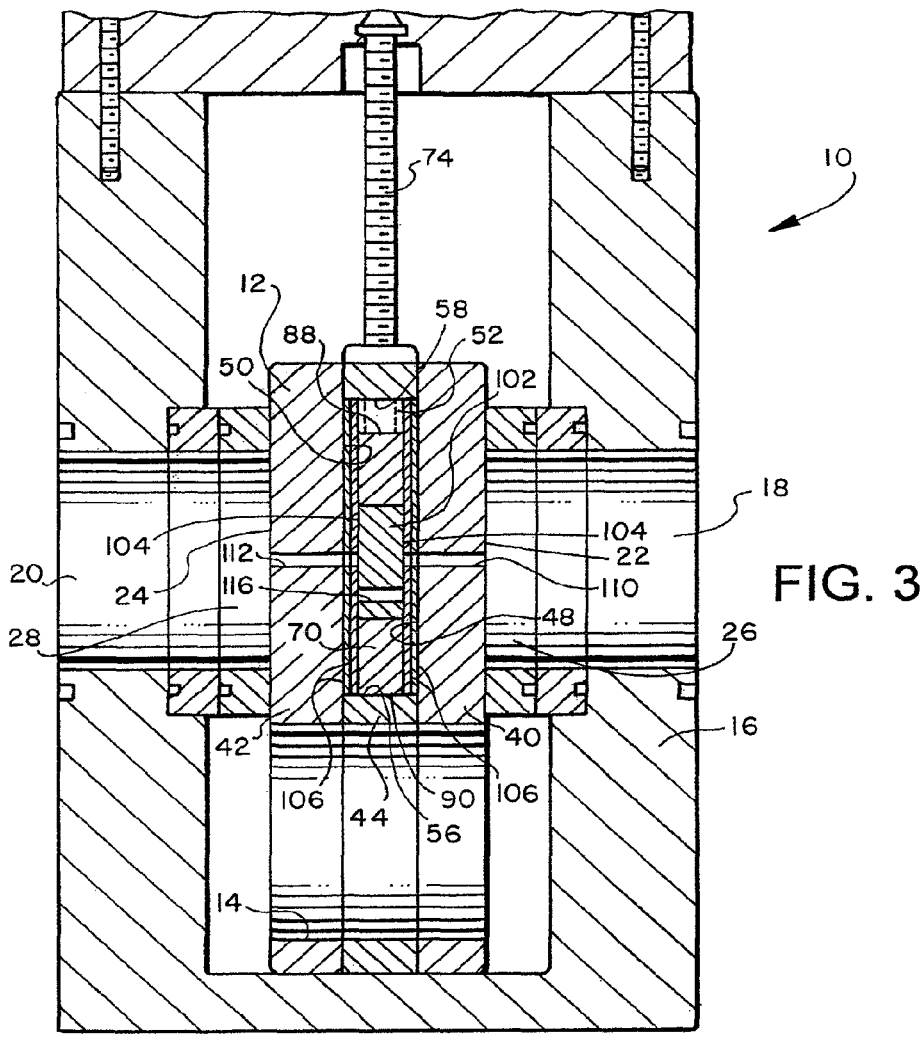
FIG. 3 a sectional view of FIG. 2.
Figure 4:
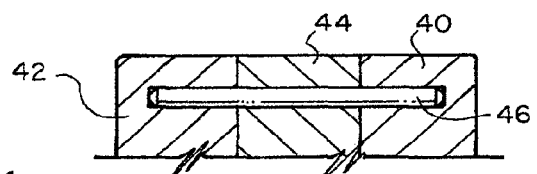
FIG. 4 is a sectional view taken along line 4-4 of FIG. 2.
Figure 5:
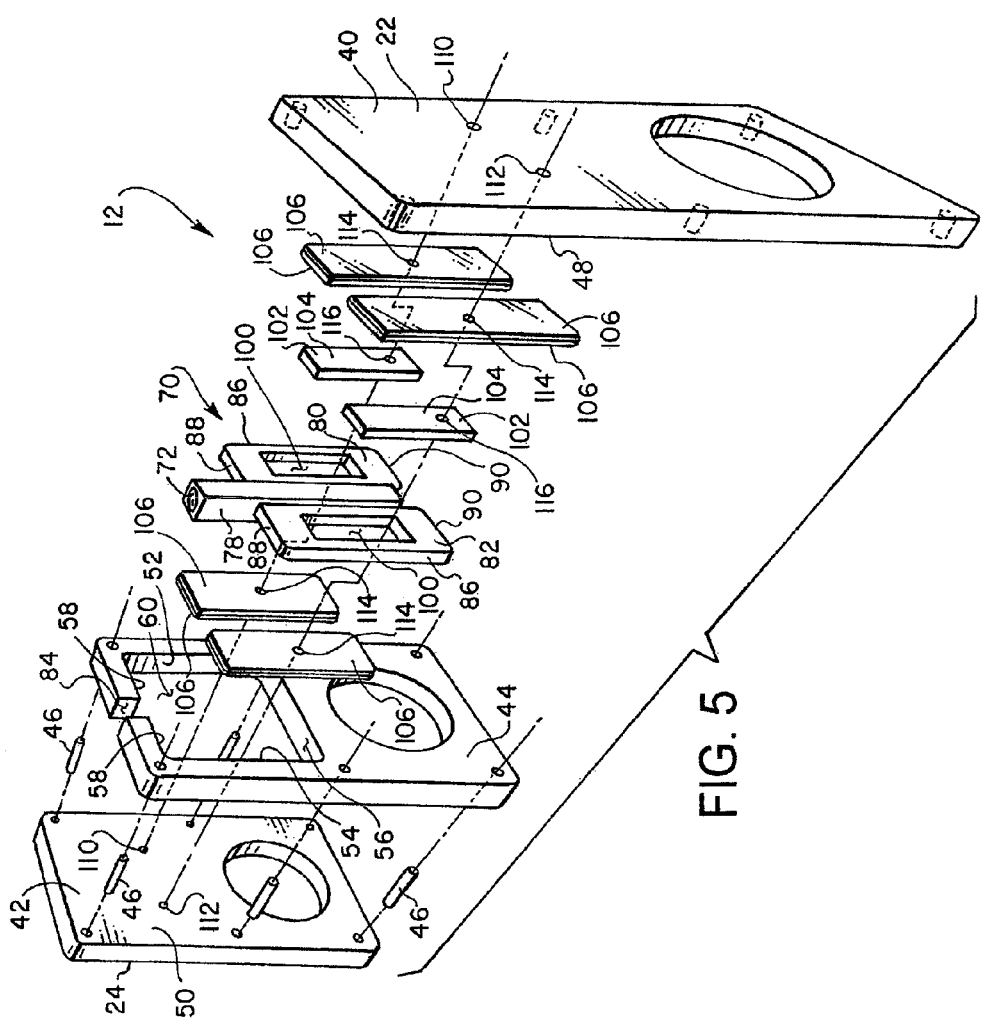
FIG. 5 is an exploded view of a representative gate.

Referring initially to FIGS. 1-6G, where like numerals indicate like and corresponding elements, a gate valve 10 has a gate 12 having internal walls defining a main gate passageway 14 and movable between opened and closed positions within a valve body 16. In the opened position the main gate passageway 14 is aligned with walls defining main passageways 18, 20 in the valve body 16 on opposite sides of the gate 12, to enable flow through the valve, and where in the closed position (FIGS. 1-3) external sealing faces 22, 24 of the gate are aligned with the main passageways 18, 20 in the valve body 16, to prevent flow through the valve in cooperation with seals 26, 28 between the gate 12 and the valve body 16.

The gate 12 is formed of layers, outer layers 40, 42 and middle layer 44, with the outer and middle layers joined by fastener pins 46. The external sealing faces 22, 24 of gate 12 are on the outer layers, and the main gate passageway 14 internal walls are aligned within the layers 40, 42, 44.

Each outer layer has an internal face 48, 50 opposing the internal face of the other outer layer. The middle layer 44 has opposing internal side faces 52, 54 joined to opposing internal end faces 56, 58, the internal faces 48, 50, 52, 54, 56, 58 of the outer and middle layers 40, 42, 44 together form a cavity 60 within gate 12 opposite the external sealing faces 22, 24 of the gate.

A carrier 70 within cavity 60 is movable between opening and closing positions and may be configured for linear actuation by way of female threads 72 within carrier 70 operable to a threaded rod 74 extending to an operator, such as handle 76, outside valve 10. The carrier 70 is formed of a central section 78 and two flank sections 80, 82 joined to opposite sides of the central section 78. The female threads 72 are formed in the central section 78, and with the central section 78 extends through a gap 84 in one of the middle layer internal end faces 58.

The flank sections 80, 82 each has a side surface 86, with the side surfaces 86 spaced and configured to closely fit with adjacent internal side faces 52, 54 of middle layer 44 for sliding linear relative movement within cavity 60. In addition, the flank sections 80, 82 each has two opposite end surfaces 88, 90. The end surfaces 88, 90 on each flank section 80, 82 have a linear distance between them less than a linear distance between the internal end faces 56, 58 of the middle layer 44, such that the carrier 70 has a range of linear travel within the cavity during linear actuation between the opening and closing positions. One end surface 88 contacts one middle layer internal end face 58 in the opening position, and the other end surface 90 contacts the other middle layer internal end face 56 in the closing position. In this manner, the flank sections end surfaces 88, 90 in contact with its respective internal faces are operative to move the gate 12 between an open and closed position.

The flank sections will each have internal walls forming equalizer cavities 100 open in the directions of the internal faces 48, 50 of gate outer layers 40, 42. Equalizer gates 102 within the equalizer cavities 100 are dimensioned for close interfitting, floating engagement with the equalizer cavities 100. Each equalizer gate 102 has opposing sealing surfaces 104 facing the directions of internal faces 48, 50 of the gate outer layers 40, 42.

Seal plates 106 are located between each sealing surface 104 of each equalizer gate 102 and its respective internal face 48, 50 of gate outer layers 40, 42. Seal plates 106 are formed from a suitable sealing material, such as Teflon® (registered to E. I. Du Pont de Nemours and Company, Delaware, USA).

Walls in the outer layers 40, 42 of the gate 12 define two spaced gate equalizer ports 110, 112 between the opposite external sealing faces 22, 24 of the gate 12. The gate equalizer ports 110, 112 extend from the external sealing face 22, 24 of each outer layer 40, 42 to the cavity 60 between the outer layers 40, 42. Walls in the seal plates 106 define seal equalizer ports 114 in the seal plates 106 aligned with the gate equalizer ports 110, 112. Walls in the equalizer gates 102 define a shiftable internal equalizer port 116 in each equalizer gate 102. The internal equalizer ports 116 are dimensioned and arranged to be opened by being aligned with the gate equalizer ports 110, 112 and seal equalizer ports 114 when the carrier 70 is in the opening position and to be closed by being shifted out of alignment with the gate equalizer ports 110, 112 and seal equalizer ports 114 when the carrier 70 is in the closing position.

Figure 6A:
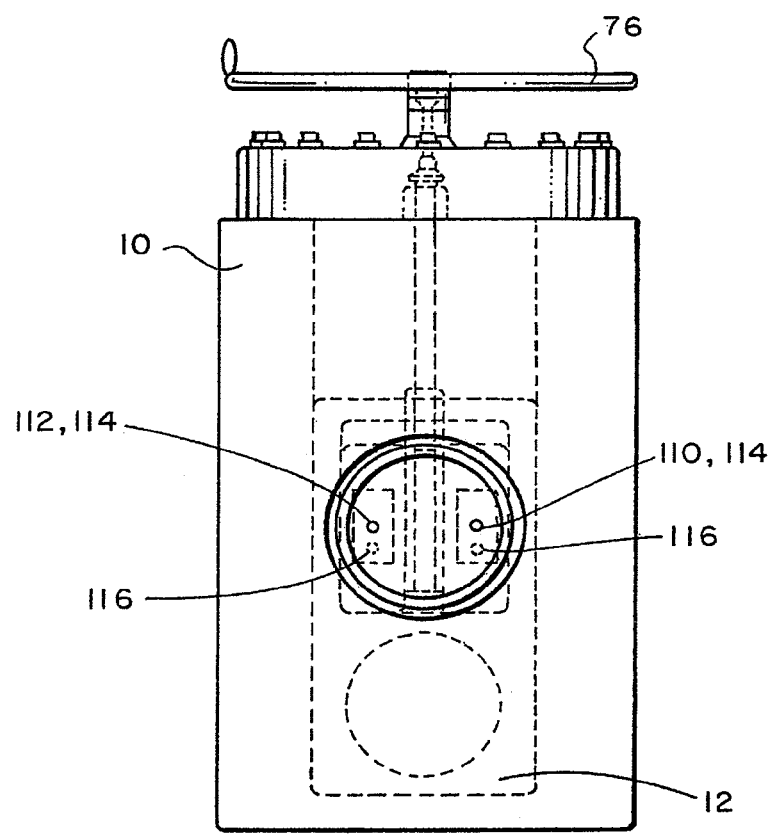
FIGS. 6A-6G are sequential views of the opening and closing of the valve of FIG. 1.

In operation, as shown in FIGS. 6A through 6G, opening and closing of the equalizer ports 110, 112 with 114, 116 is automatically sequenced by operation of the handle 76 in actuating the gate 12. In FIG. 6A, valve 10 is closed, gate 12 is in the closed position, and carrier 70 is in the closing position. Internal equalizer ports 116 are out of alignment with gate equalizer ports 110, 112 and seal equalizer ports 114, which allows the equalizer port to be closed against differential pressure across the valve. The floating engagement of equalizer gates 102 in cavities 100 allows differential pressure to push equalizer gates 102 against seal plates 106 to enable sealing.

Figure 6B:
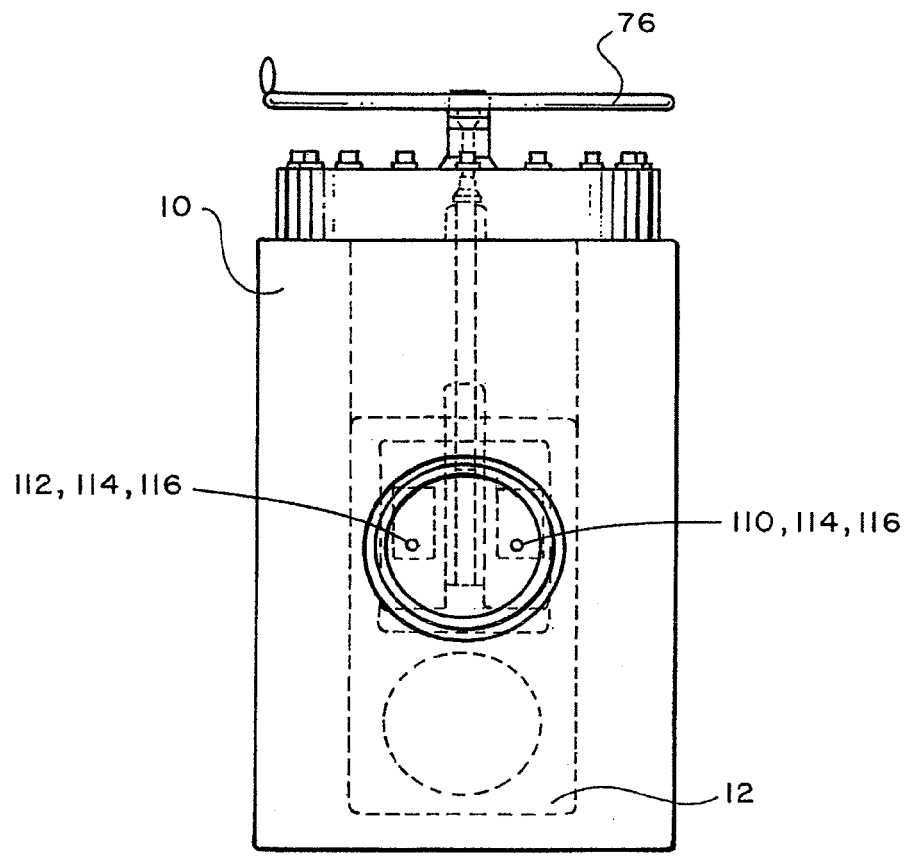

In FIG. 6B, the handle 76 has been turned, raising carrier 70 to the opening position where the flank section end surfaces abut the internal end surfaces of the gate layer middle layer. Gate 12 has not yet moved. This movement of carrier 70 brings ports 110, 112, 114, 116 into alignment, opening the equalizer port and equalizing pressure across the valve. Even where the differential pressure is high, the force required to open the equalizer ports is minimal because of the small surface areas involved. In the event of damage due to repeated actuation of the equalizer ports in the presence of flow and friction, the damage is readily and inexpensively repaired by the replacement of the inexpensive seal plates.

Figure 6C:
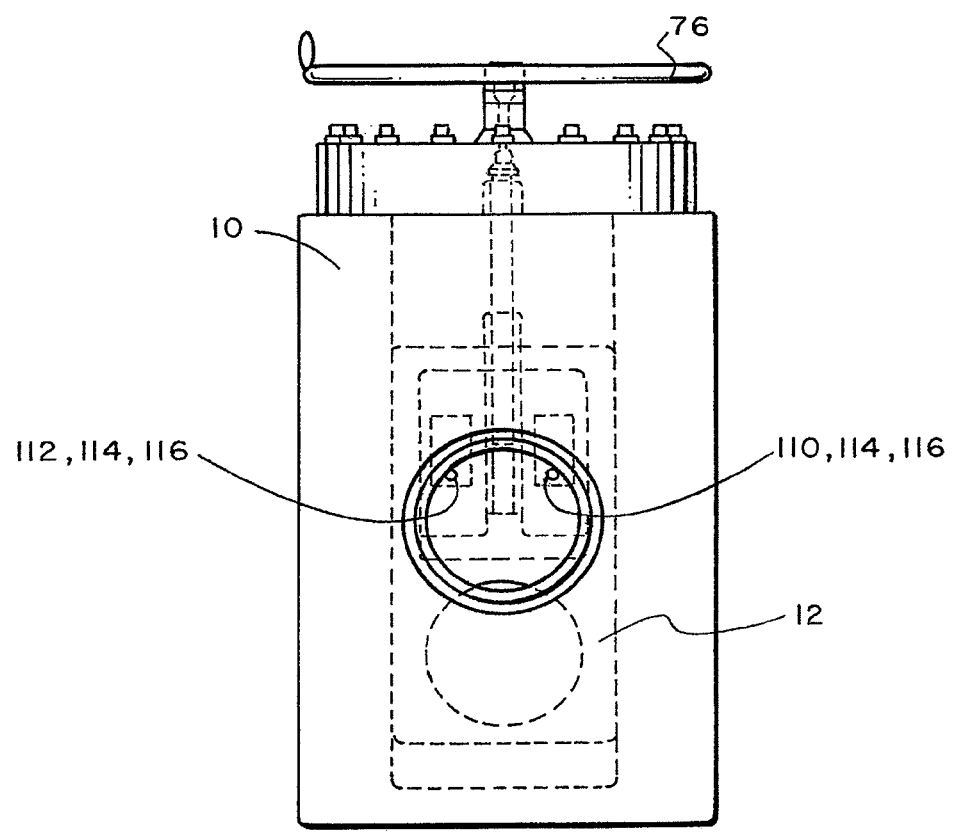
Figure 6D:
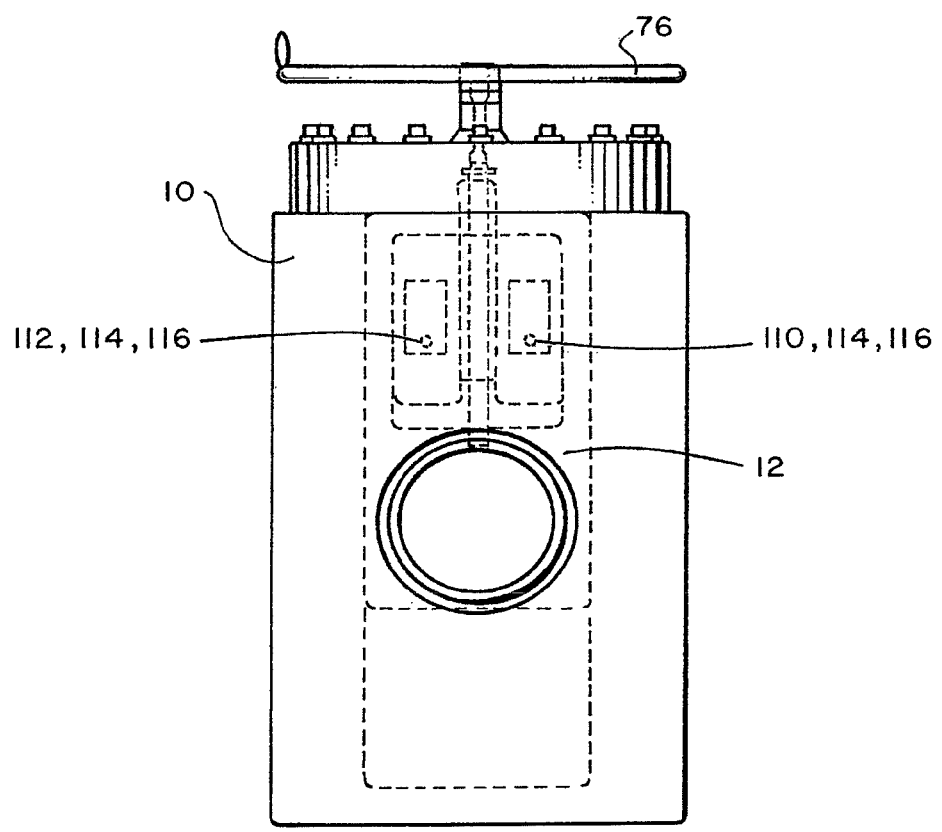

In FIG. 6C, the gate 12 has been raised by the carrier 70 to the point where the main passageway is cracked open. Because pressure across the valve has already been equalized, minimal force is required to move the gate and cracking the valve results in no damaging flow. In FIG. 6D, the valve is fully open, with gate 12 in the open position. Carrier 70 is still in the opening position.

Figure 6E:
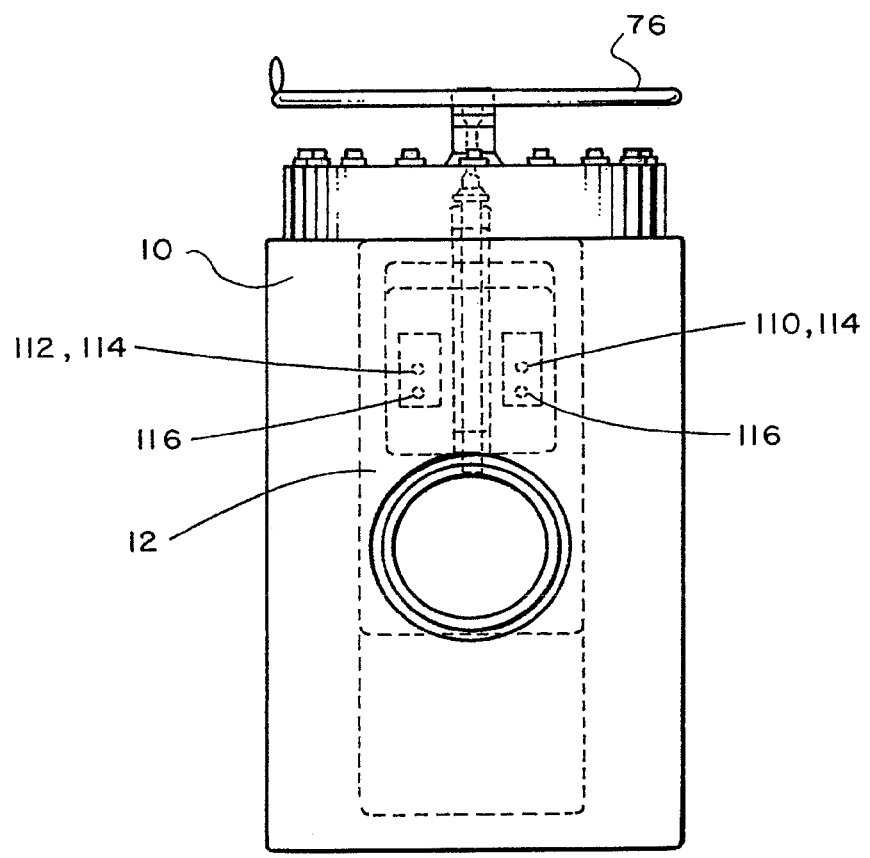
Figure 6F:
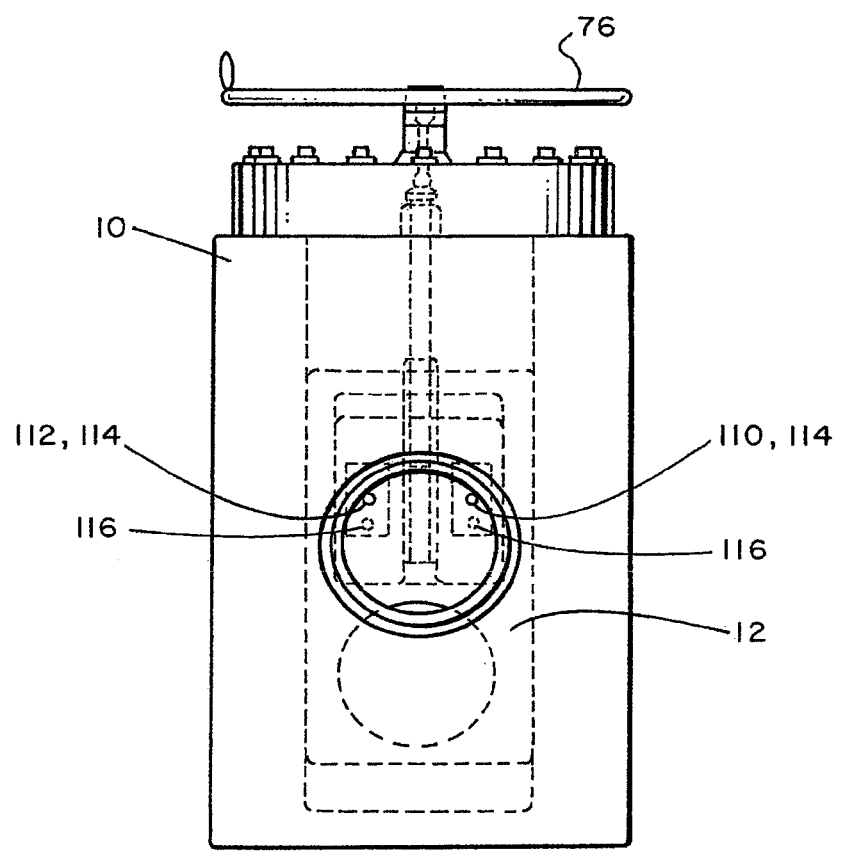
Figure 6G:
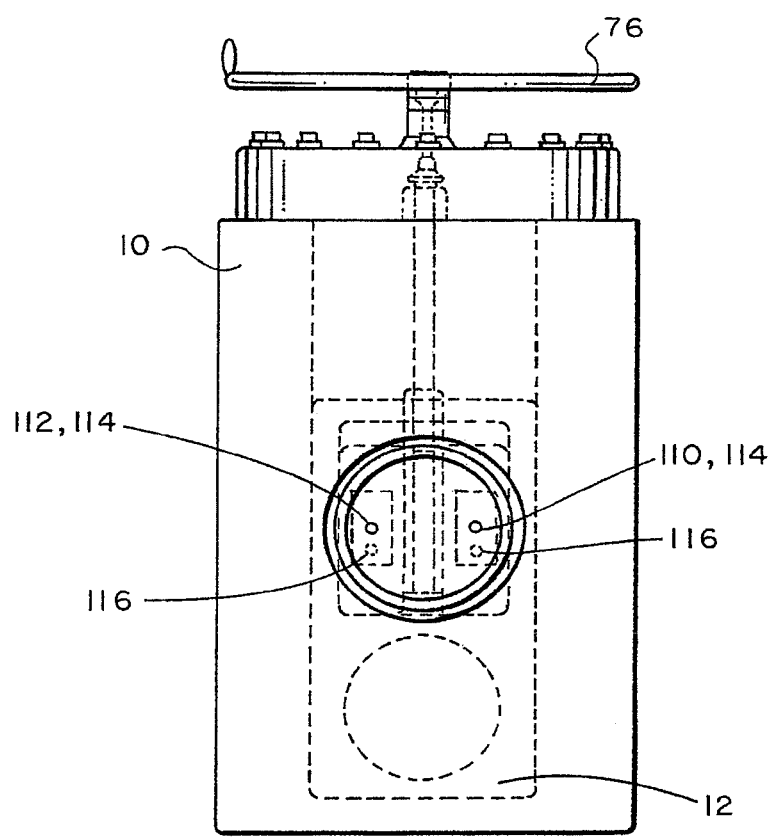

FIGS. 6E through 6G illustrate the closing sequence. Upon initial rotation of the handle 76, carrier 70 moves to the closing position shown in FIG. 6E. Equalizer ports 110, 112, 114, 116 shift out of alignment to close the equalizer port. Gate 12 has not yet moved. In FIG. 6F, the valve is partially closed, and in FIG. 6G, the valve is fully closed (as in FIG. 6A).

Figure 7:
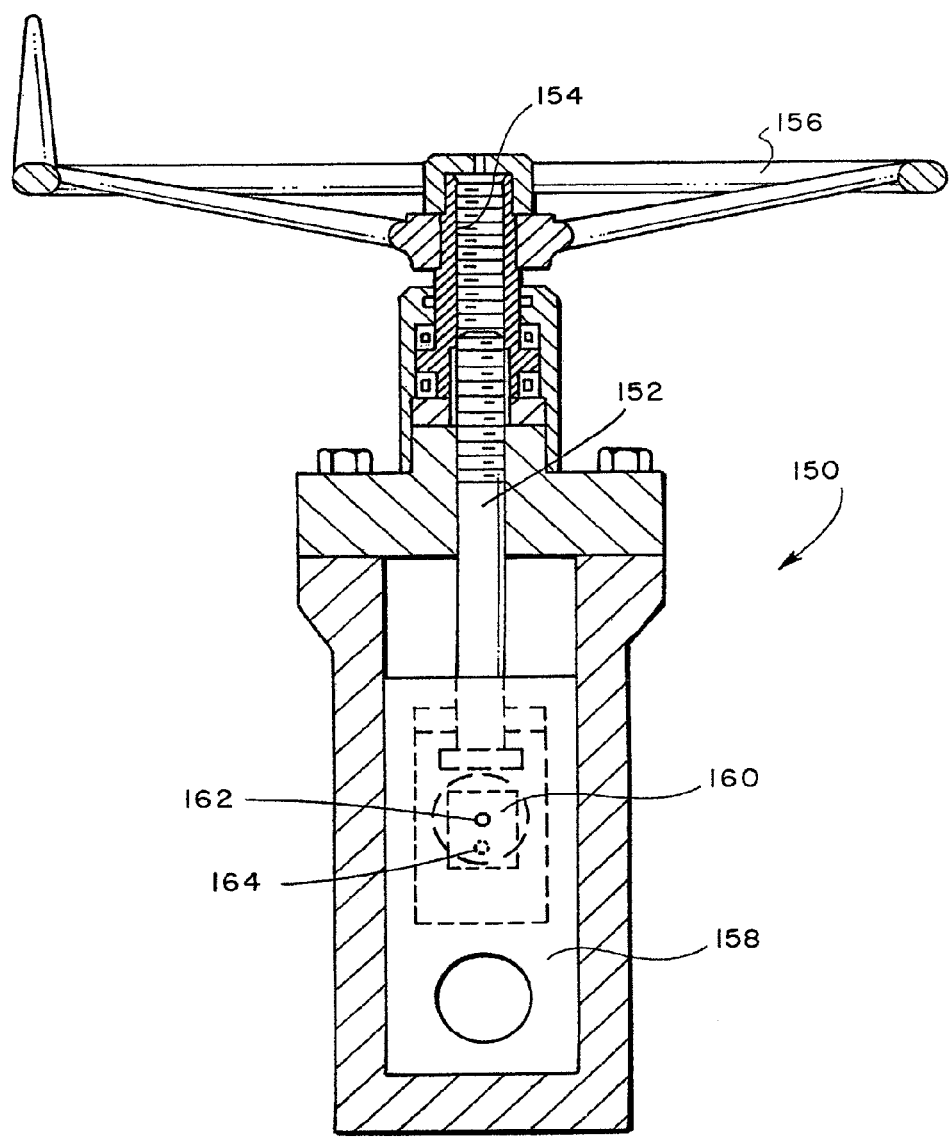
FIG. 7 is a rising stem type valve with an alternate form of an equalizer gate.

FIG. 7 illustrates an alternate embodiment where valve 150 is a rising stem valve. In a rising stem valve, the stem 152 is pulled into internal threads 154 of handle 156. Unlike in valve 10, stem 152 does not rotate with respect to gate 158. This eliminates the need to accommodate the passage of the stem through the carrier, which required that carrier 70 be configured as two flank sections 80, 82 and a central section 78, with an equalizer gate 102 in each flank section. In the valve of FIG. 7, a simpler single equalizer gate 160 is utilized, with the equalizer ports 162, 164 otherwise configured in similar fashion to those of valve 10.

Figure 8:
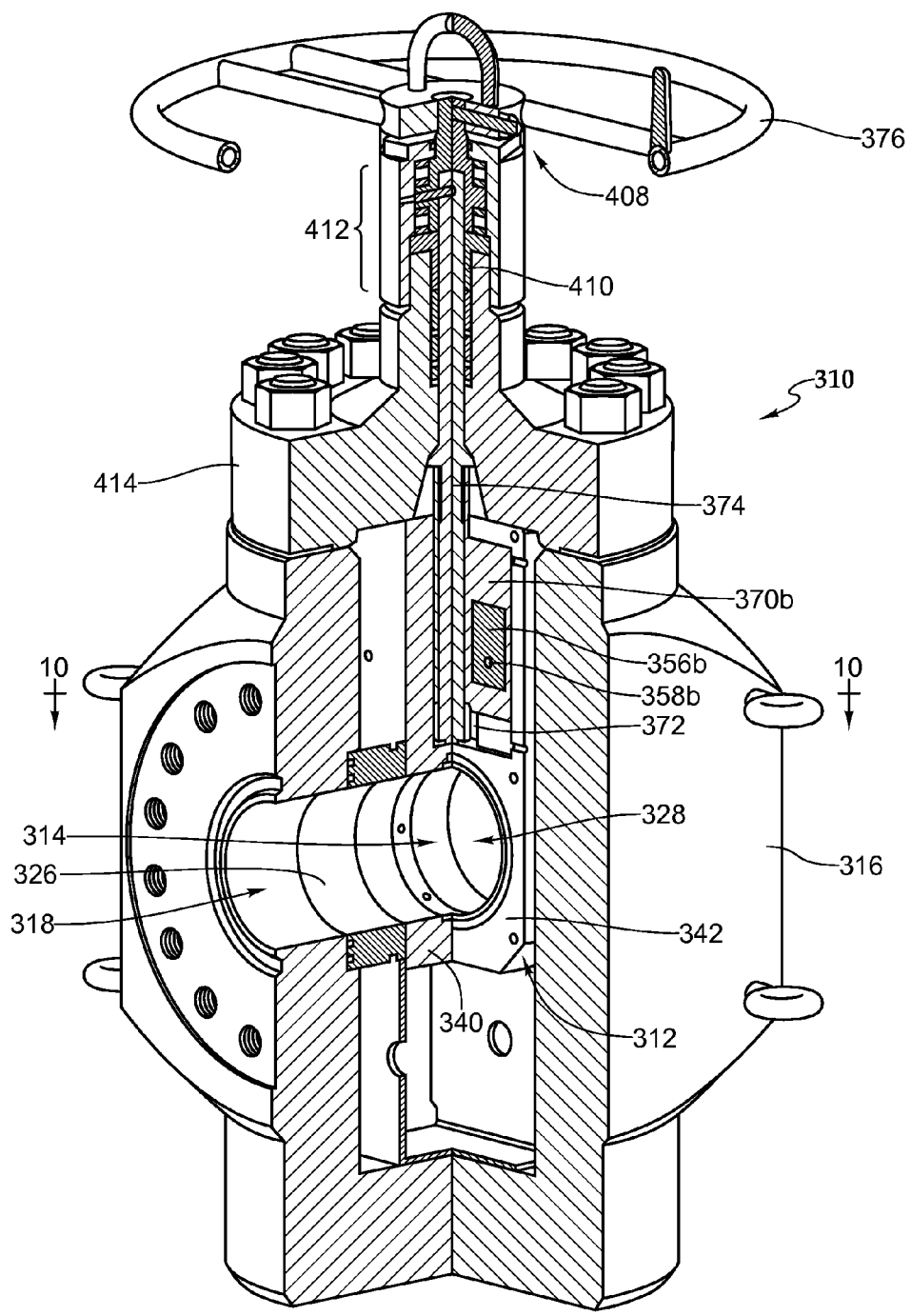
FIG. 8 is a perspective view with a partial cut out of a representative second embodiment of a gate valve.
Figure 9:
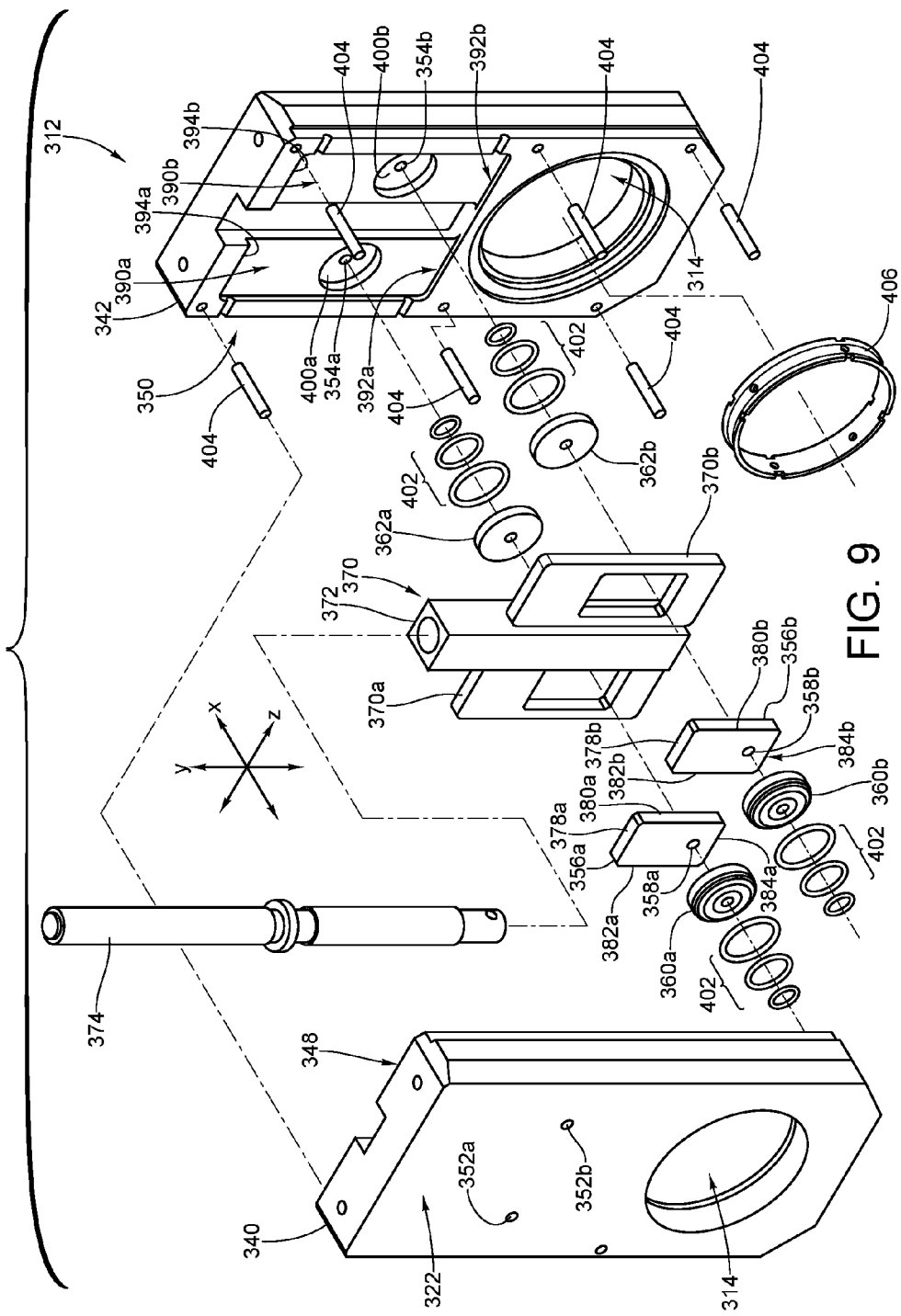
FIG. 9 is an exploded view of the gate of the gate valve of FIG. 8. described herein.
Figure 10:
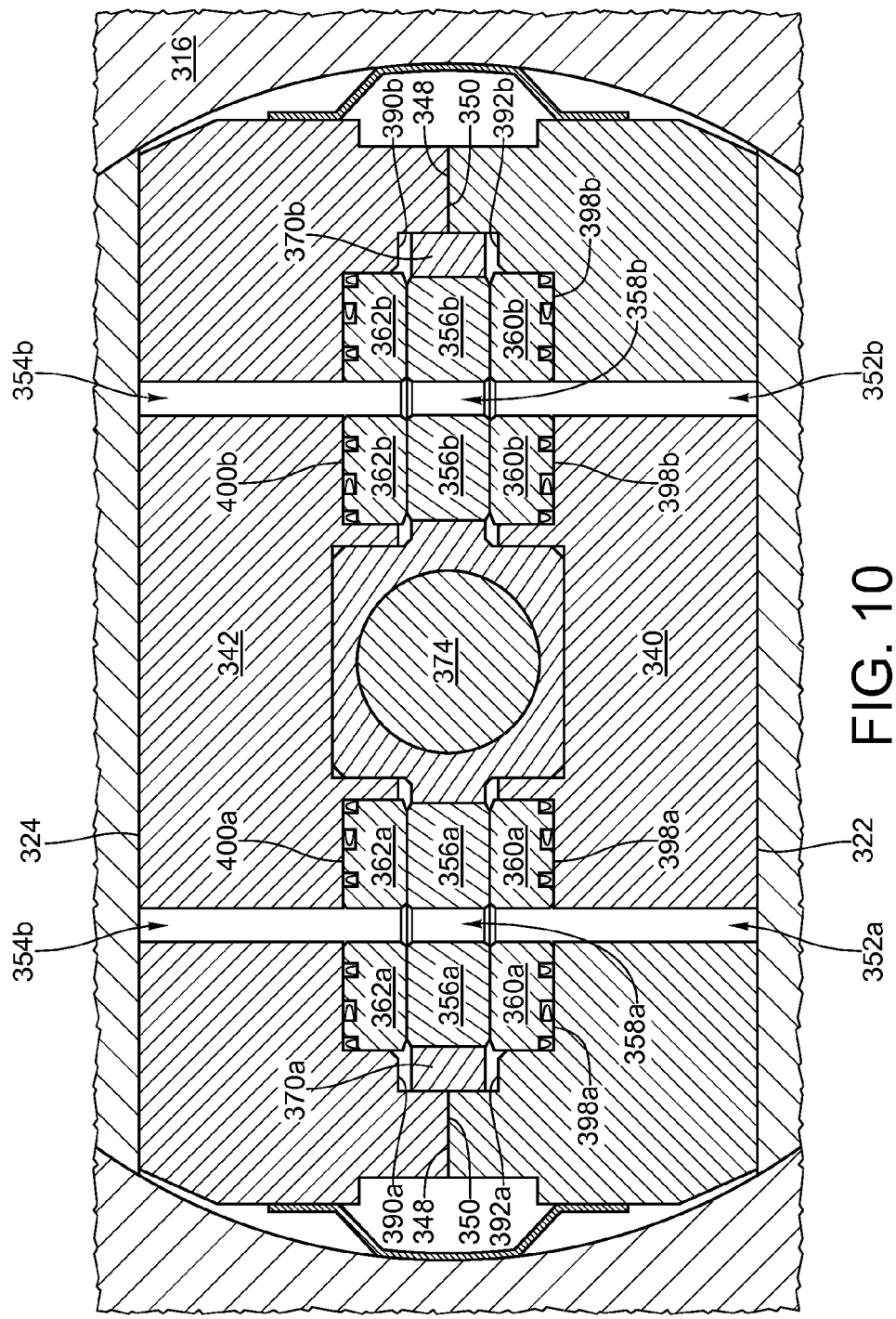
FIG. 10 is a sectional view of the main gate along line 10-10 of FIG. 8.

Referring now to FIGS. 8-10, illustrated is an alternate embodiment of a gate valve with a pressure equalization passageway or port extending through the main gate. Gate valve 310 comprises a gate 312 mounted within valve body 316 for opening and closing a flow passageway through the valve. Gate 312 is moveable in a linear fashion between opened and closed positions. An opening 314 formed in gate 312 allows fluid to pass through the gate when the gate is raised to the opened position, with opening 314 aligned with a main fluid passageway through the valve. The main fluid passageway through the valve 310 is comprised, in part, by openings 318 and 320 that are formed in the valve body 316, on opposite sides of the gate 312. When lowered to the closed position, the gate blocks fluid from flowing through the main fluid passageway. Face 322 of the gate cooperates, when the gate is closed, with seat 326 to seal against fluid flowing through the valve through opening 318. Similarly, face 324 of gate 312, which is opposite of face 322, cooperates with seat 328 to create a seal that prevents fluid entering the valve through opening 320 from flowing through the main fluid passageway through the valve. When gate 312 is in the opened position, seats 326 and 328 cooperate with the gate to create a seal that prevents fluid from flowing within the valve body other than through the main fluid passageway.

Within gate 312 is formed internal cavity 330. In this embodiment the cavity is defined between two pieces 340 and 342. Each piece is formed, for example, by a plate that has been partially hollowed (for example by machining it) to form recesses on the faces of the two plates, so that, when the two pieces are joined, the internal cavity is formed. Although the embodiment contemplates that recesses formed in the internal surfaces of the plates are mirror images, in alternate embodiments, the recesses need not be mirrored images of each other, and the cavity could be formed by recesses in just one of the two plates. The cavity could also be formed from three or more pieces, such as, for example, using the structure illustrated by the embodiment of FIGS. 1 to 7. The internal cavity is defined in part by opposing faces 348 and 350, which in this exemplary embodiment are the internal faces of side walls formed, respectively, by pieces 340 and 342. Constructing the main gate 312 from two or more allows for easier assembly and a tighter seals for internal gates, as described below. However, in an alternate embodiment, the internal cavity could be formed from a single piece of steel.

At least one port extends through gate 312 between internal face 348 and external face 322, and at least one extends between internal face 350 and external face 324. Together these ports comprise, at least in part, a pressure equalization passageway (or port) through gate 312 that is normally closed when the gate is closed, but is opened first, before gate 312 is opened, for relieving at least partially a pressure differential across the gate.

In this example, there are two ports 352*a* and 352*b* extending between internal face 348 and external face 348, and two ports 354*a* and 354*b* extending between internal face 350 and external faces 324. Fluid communication between each of the pairs of ports 352*a* and 354*b*, and ports 352*b* and 354*b*, is controlled by internal gates 356*a* and 4356*b*. Each of the internal gates is shifted, in unison in this example, between an open position and a closed position. Each internal gate 356*a* and 356*b* has a port 358*a* and 358*b*, respectively, extending through it that allows for fluid communication through the internal gate. When a internal gate 356*a* or 356*b* is in the opened position, the internal gate's port aligns with the corresponding pair of ports in the walls between the internal cavity and the exterior side surfaces of the main gait 312. In the case of gate 356*a*, when its port 358*b* is aligned with ports 352*a* and 354*a*, an pressure equalization passageway is opened through the gate. Similarly, for gate 356*b*, when its port 358*b* aligns with ports 352*b* and 354*b* in the opened position, a second, open pressure equalization passageway is opened through gate 312. When the gates 356*a* and 356*b* are shifted to their respective closed positions, no passageway through the main gate 312 is open. No fluid communication occurs between the respective pairs of ports 352*a* and 354*a*, and 352*b* and 354*b*, and thus no fluid communication occurs across the gate 312 when in a closed position.

Opening one or more relatively small (as compared to the main fluid passageway through the valve 310) diameter passageways through main gate 312 before gate 312 is opened results in a reduction in the pressure differential, if any, across the main gate. Even though the pressure differential across main gate 312 is not necessarily reduced to the point of it being equal, each internal gate 356a and 356b, in combination with a valve seats 360a and 362a, and valve seats 360b and 362b, respectively, will be referred to as an equalizer valve; each gate 356a and 356b will be referred to as an equalizer gate or internal gate to avoid confusion with gate 312; and the passageway through the main gate formed by each pair of ports (352a and 354a, and 352b and 354b, respectively) will also be referred to as an equalizer port. Each equalizer port is opened and closed by the equalizer valve. Although two pressure equalizer ports and equalizer valves are used in this exemplary embodiment, alternate embodiments may include one equalizer port and valve, or more than two equalizer ports and valves, or an equalizer gate opening and closing multiple ports. Although the illustrated embodiment contemplates each of the plurality of equalizer ports being opened at the same time to relieve pressure, the opening of multiple equalizer ports could, in alternate embodiments, be staged or sequenced.

Equalizer gates 356a and 356b are shifted between opened and closed positions by carriers 370a and 370b. Each carrier is connected to a stem coupling 372, which couples each carrier to a valve stem comprised in this example of threaded rod 374. Turning the rod using handle 376 raises and lowers the carriers 370a and 370b, depending on the direction of rotation. Each carrier is free to move up and down a predetermined distance within the internal cavity formed in main gate 312. When the top of a carrier reaches and engages the upper surface of internal cavity of the main gate, pulling upwardly the carrier places a force on the gate, causing it to shift upwardly to toward its opened position. Pushing the carrier downwardly to the bottom surface of the internal cavity allows application of a force to the main gate that will shift it toward the closed position.

In the illustrated embodiment, each equalizer gate 356a and 356b floats within the carrier, meaning that it is not attached or connected to the carrier. Each gate 356a and 356b is permitted to move in a direction generally parallel to the axis of its pressure equalization port (358a and 358b, respectively), and normal to the surface of its face. For purposes of this description, this direction will be parallel to the "x" axis in a three-dimensional Cartesian reference shown in FIG. 9. Each equalizer gate 356a and 356b is otherwise constrained against movement along the directions of the "y" and "z" axes. In the illustrated example, the portions of the carrier for each equalizer gate 356a and 356b that abut the gate's top edge (378a or 378b), left side edge (380a or 380b), right side edge (382a or 382b), and bottom edge (384a or 384b) of the equalizer gate constrain movement in the "y" and "z" directions. Alternatively, movement of the carrier in the "z" direction (or in a direction orthogonal to the path of the carrier during shifting of the equalizer gates) could be constrained, in part, by complementary internal surfaces of the gate 312. By not constraining movement of each equalizer gate 356a and 356b along the x axis with the carrier, or, in other words, along the equalizer gates freedom to move along at least the "x" axis, the equalizer gate can find a proper seating between opposing pairs of valve seats that are being pressed against the faces of the equalizer gate. For equalizer gate 356a, the valve seats are those referenced as 360a and 362b. For equalizer gate 356b, the valve seats are those referenced as 360b and 362b. As can be best seen in FIG. 10, the equalizer gates have a larger dimension than the carriers along the "x" axis—they are, in other words, thicker—to avoid interference between the carriers and the valves seats.

The position of each equalizer gate is shiftable in a direction perpendicular to the "x" axis while each valve seat remains in close fitting engagement with the face of the equalizer valve. Constraining movement of the gate in the "x" and "y" directions to a path between open and closed positions, and using the carrier to shift the gate along that path, controls alignment of port 358a with ports 352a and 354a, and port 358b with ports 352b and 354b in the open position and complete non-alignment (or blocking alignment) in the closed position.

the surfaces of the internal faces 348 and 350 are shaped in this example to accommodate within the cavity movement of the carriers 370a and 370b along a predetermined, fixed path between open and closed positions of the equalizer gates, and to limit its movement at least at the ends of the path. The surfaces of the internal faces also accommodate and guide movement of the stem coupling 372. For example, recesses 390a and 390b formed in the internal face 350 of piece 342 accommodate movement of carriers 370a and 370b, respectively, as well as equalizer gates 356a and 356b, respectively, as they shift between opened and closed position. In the closed position, the bottom of the respective carriers rest against bottom lips 392a and 392b of recesses 390a and 390b, and in opened position, the top edge of each of the carriers abut top lips 394a and 394b of recesses 390a and 3901). Internal face 348 of piece 340 is also shaped with recesses 396a and 396b (visible only in FIG. 10) that mirror recesses 390a and 3901). Once the carriers, with the equalizer gates, are lifted to the opened position, the top edges of the carriers abut a top lips of the recesses formed in each piece 340 and 342. Exerting a continued upward pull on the carrier by rotating valve stem 374 will lift the main gate. Similarly, shifting the carriers, with the equalizer gates, to the closed position will cause the bottom edges of the carriers to move toward and then abut the lower lips, so that continued downward force applied by rotating the valve step 374 will push down on the main gate 312, closing it.

Also formed on the internal or inside faces 348 and 350 are recesses 398a, 398b, 400a, and 400a that receive and hold in position valves seats 360a, 360a, 362a, and 362b, respectively. Each of the seats are sealed within its respective recess a plurality of O-ring seals 402. The two pieces 340 and 342 are tightly connected using a plurality of pins 404 or other connections together. Assembling and tightly connecting the two pieces 340 and 342 together presses opposing pairs of valve seats against opposite faces of each equalizer gate 356a and 356b, causing the O-rings to compress. Because the equalizer gates are allowed to float or move in the "x" direction (they may also be permitted rotate or tilt to a limited degree about the "y" and "z" axes), a seal is able to form during assembly between the valve seats on opposite sides of equalizer gate and its respective faces. That seal remains, even as the equalizer gates are shifted the open and closed positions within the main gate, and as the main gate is being opened and closed. As each equalizer gate shifts up and down within the main gate 312, it's position with respect to the "x" and "z" axes remains essentially constant with respect the two valves seats, which do not move with respect to the gate. Ring 406 functions to seal the two openings in each piece 340 and 342 that form opening 314, through which fluid flows through the valve with the main gate 312 is in the opened position. Once the two pieces 340 and 342 are joined to form the gate 312, the outer walls of the main gate remain in fixed position with respect to each other, cooperating with seats 326 and 328, as the gate 312 is moved from the closed position, to the opened position, and back to closed position.

The embodiments of FIGS. 8-10 discloses a non-rising stem. Actuation of the gate is driven, in this example, by an operator turning handle 376, which turns rod that comprises valve stem 374. The valve stem, in this example, includes a lower portion that is threaded into the stem coupling 372 connected to the carriers 370a and 370b. Exterior threads on the bottom portion of the rod of the valve stem, which are not indicated in the drawings, cooperate with interior threads in a hole formed through the stem coupling 372 to shift the carriers 370a and 370b within the main gate 312, and to then shift the position of the main gate. The top end of the rod extends through the gland nut 408, which tightens packing 410 within packing gland 412 on top of bonnet 414, and connects with handle 376.

In an alternative embodiment the top end of the rod is threaded and cooperates with a threaded portion of the handle to translate the rod along its central axis, the stem thereby rising through the handle as it is turned to open the valve. The bottom of the rod is connected to the carriers though coupling that permits it to raise and lower the carriers while otherwise rotating freely. Actuation of the valve may also be configured with a reduction gearbox and/or electric or hydraulic actuator operation. When operation is not manual, there may include a manual override for a fail-safe closed or open system.

While the invention has been illustrated and described as embodied in particular gate valves, it is not intended to be limited to the details shown. Various omissions, modifications, substitutions and changes in the forms and details of the embodiments illustrated and in their operation can be made by those skilled in the art without departing from the spirit of the present invention.

What is claimed is:

1. A valve, comprising:
   a valve body;
   a main gate housed within the valve body, movable between open and closed positions by linear actuation within the valve body, the main gate having opposite outer side walls fixed relative to each other for cooperating with openings in the valve body for blocking fluid flow through the valve body between the openings when in the closed position and permitting the fluid flow through the valve body when in the opened position;
   at least one pressure equalization passageway formed through the gate for communicating fluid from one side of the gate to another side of the gate, the pressure equalization passageway being comprised of ports formed through the first and the second sides of the gate;
   an internal gate disposed within a cavity formed within the main gate for opening and closing the pressure equalization passageway, the internal gate having a port formed in the internal gate and a pair opposing valve seats mounted in fixed positions within the main gate on opposite sides of the internal gate, with which the internal gate has a close-fitting relationship, the pressure equalization passageway extending through the opposing valve seats; and
   a carrier for shifting the internal gate between a closed position in which a port formed through the internal gate does not align with the internal passageway and the internal gate blocks the fluid from flowing through the internal passageway, and an opened position in which the port in the internal gate aligns with the internal passageway for allowing the fluid flow past the internal gate; the internal gate being positioned between an upper and a lower structural member of the carrier without being constrained within carrier in directions toward and away from each of the pair opposing valve seats, thereby permitting the internal gate to move to find a proper seating between the pair of opposing valve seats.

2. The valve of claim 1, further comprising a valve stem coupled with the carrier for moving, upon actuation in a first direction, the carrier for shifting the internal gate from the closed to the opened position, wherein the carrier, when after the internal gate reaches the open position, engages the main gate for lifting the main gate upon further actuation of the valve stem.

3. The valve of claim 2, wherein actuation of the valve stem in a second direction moves the carrier in a direction for shifting the internal gate from the opened position to the closed position, the carrier, after the internal gate reaches the closed position, engaging the main gate for enabling pushing the main gate lower upon further actuation of the valve stem.

4. The valve of claim 1, further comprising a second internal gate for opening and closing a second pressure equalization passageway extending through the main gate, the second internal gate being shifted by a second carrier.

5. The valve of claim 4, wherein the two carriers are connected to opposite sides of a coupling, with which the valve stem is coupled for causing translation of the carriers.

6. The valve of claim 5, wherein the valve stem comprises a threaded portion for cooperating with threads on the coupling for translating the coupling on the valve stem as the valve stem is turned during actuation.

7. A valve, comprising:
   a main gate defining a main gate passageway and movable between opened and closed positions within a valve body, where in the opened position the main gate passageway is aligned with walls defining main passageways in the valve body on opposite sides of the gate, to enable flow through the valve, and where in the closed position external sealing faces of the main gate are aligned with the main passageways in the valve body, to prevent flow through the valve in cooperation with seals between the gate and the valve body;
   an interior cavity formed within the gate and having opposing internal faces;
   an equalizer gate shiftable in a linear direction within the interior cavity;
   a gate equalizer port defined through the each of the external sealing faces of the gate for enabling communication of fluid across the gate when the gate equalizer ports are aligned with an internal equalizer port formed in the equalizer gate;
   a carrier for shifting the equalizer gate between an open position in which the gate equalizer ports are aligned with the internal equalizer port, and a closed position, in which the internal equalizer port is not aligned with the gate equalizer ports; and
   a stem coupled with the carrier for moving the carrier to shift the equalizer gate between the closed position and the open position;
   wherein the equalizer gate has a floating engagement with the carrier and the equalizer gate is sealed with the internal faces of the cavity when in the open position and also when in the closed position.

8. The valve of claim 7, further comprising seal plates located on opposite sides of the equalizer gate for sealing the equalizer gate against the internal surfaces of the cavity in the open and closed positions to prevent fluid from entering the cavity.

9. The valve of claim 7 wherein the carrier has two opposite end surfaces, the end surfaces having a linear distance between them less than a linear distance between internal end faces of the interior cavity, such that the carrier has a range of linear travel within the interior cavity during linear actuation between the opening and closing positions, with one opposite end surface contacting one cavity internal end face in the opening position, and with the other end surface contacting the other cavity internal end face in the closing position, such that the opposite end surfaces of the carrier in contact with the internal end faces of the interior cavity are operative to move the gate between the opened and closed positions.

10. The valve of claim 9, wherein the carrier has side surfaces that closely interfit with the internal side faces of the interior cavity to enable sealing of the carrier within the interior cavity while allowing sliding linear relative movement within the interior cavity.

11. The valve of claim 7, wherein, when the equalizer gate is moved to the open position, continued actuation of the stem lifts the main gate toward the open position, and when the equalizer gate is moved to the closed position by actuation of the stem, continued actuation of the stem pushes the main gate toward the closed position.

12. The valve of claim 11, wherein the stem comprises a threaded portion for cooperating with a threaded portion on the carrier for translating the carrier as the stem is turned during actuation.

13. The valve of claim 7, further comprising a second equalizer gate shiftable in a linear direction within the interior cavity by the carrier and a second gate equalizer port defined through the each of the external sealing faces of the gate for enabling communication of fluid across the gate when aligned with an internal equalizer port formed in the second equalizer gate when the second equalizer gate is in an open position.

* * * * *